US012475827B2

(12) United States Patent
Huang et al.

(10) Patent No.: US 12,475,827 B2
(45) Date of Patent: Nov. 18, 2025

(54) METHOD FOR PROCESSING COLOR DATA, LIGHT SOURCE SYSTEM, DEVICE, EQUIPMENT, AND STORAGE MEDIUM

(71) Applicant: SHENZHEN UASCENT TECHNOLOGY CO., LTD., Guangdong (CN)

(72) Inventors: Weipeng Huang, Guangdong (CN); Kaihua Wu, Guangdong (CN); Lin Tang, Guangdong (CN); Bin Sun, Guangdong (CN); Ang Xu, Guangdong (CN); Shaofeng Zhang, Guangdong (CN); Ming Xu, Guangdong (CN); Yizhi Pan, Guangdong (CN)

(73) Assignee: SHENZHEN UASCENT TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/566,661

(22) PCT Filed: Feb. 27, 2023

(86) PCT No.: PCT/CN2023/078375
§ 371 (c)(1),
(2) Date: Dec. 3, 2023

(87) PCT Pub. No.: WO2024/051110
PCT Pub. Date: Mar. 14, 2024

(65) Prior Publication Data

US 2025/0232700 A1 Jul. 17, 2025

(30) Foreign Application Priority Data

Sep. 5, 2022 (CN) ......................... 202211078834.5

(51) Int. Cl.
*G09G 3/20* (2006.01)

(52) U.S. Cl.
CPC ... *G09G 3/2003* (2013.01); *G09G 2320/0242* (2013.01); *G09G 2320/0626* (2013.01); *G09G 2360/144* (2013.01)

(58) Field of Classification Search
CPC ......... G09G 3/2003; G09G 2320/0242; G09G 2320/0626; G09G 2360/144
See application file for complete search history.

(56) References Cited

U.S. PATENT DOCUMENTS

| | | | | |
|---|---|---|---|---|
| 9,875,724 B2 * | 1/2018 | Gao | ......................... | G09G 5/02 |
| 2009/0167950 A1 * | 7/2009 | Chen | ......................... | G09G 5/02 345/589 |

(Continued)

FOREIGN PATENT DOCUMENTS

| | | |
|---|---|---|
| CN | 1666505 A | 9/2005 |
| CN | 1666506 A | 9/2005 |

(Continued)

OTHER PUBLICATIONS

First Chinese Search Report for Chinese Patent Application No. 2022110788345 dated Jan. 3, 2024. 5 pages.

(Continued)

*Primary Examiner* — Kenneth Bukowski
(74) *Attorney, Agent, or Firm* — Brooks Kushman P.C.

(57) ABSTRACT

A method for processing color data, which includes steps of: obtaining initial color data of a target display area collected by a color sensor; converting the initial color data into color data to be processed in a target color space that includes a saturation channel and brightness channel; and adjust an initial saturation value of the color data to be processed in the saturation channel and an initial brightness value of the color data to be processed in the brightness channel to obtain first target color data, the first target color data is applied to adjust a color rendering of the light source so that a color rendering error between the color rendering of the light (Continued)

source and a color rendering of the target display area is within an error margin.

14 Claims, 3 Drawing Sheets

(56) References Cited

U.S. PATENT DOCUMENTS

| | | | | |
|---|---|---|---|---|
| 2011/0199541 | A1* | 8/2011 | Fujine | H04N 9/643 348/E9.04 |
| 2011/0279740 | A1* | 11/2011 | Fujine | H04N 9/68 348/E3.015 |
| 2012/0044281 | A1* | 2/2012 | Kang | G09G 3/3413 345/690 |
| 2017/0354013 | A1 | 12/2017 | DeMayo | |

FOREIGN PATENT DOCUMENTS

| | | | |
|---|---|---|---|
| CN | 1906952 | A | 1/2007 |
| CN | 1993999 | A | 7/2007 |
| CN | 101217674 | A | 7/2008 |
| CN | 102742359 | A | 10/2012 |
| CN | 102783156 | A | 11/2012 |
| CN | 106803948 | A | 6/2017 |
| CN | 110609722 | A | 12/2019 |
| CN | 111586300 | A | 8/2020 |
| CN | 111899182 | A | 11/2020 |
| CN | 113260127 | A | 8/2021 |
| CN | 113556525 | A | 10/2021 |
| CN | 113630655 | A | 11/2021 |
| CN | 113795071 | A | 12/2021 |
| CN | 114266838 | A | 4/2022 |
| CN | 114677298 | A | 6/2022 |
| CN | 118101854 | A * | 5/2024 |

OTHER PUBLICATIONS

Supplementary Chinese Search Report for Chinese Patent Application No. 2022110788345 dated Mar. 22, 2024. 4 pages.

Supplementary Chinese Search Report for Chinese Patent Application No. 2022110788345 dated Apr. 28, 2024. 4 pages.

Chinese Office Action for Chinese Patent Application No. 202211078834.5 dated Jan. 5, 2024. 20 pages.

Chinese Office Action for Chinese Patent Application No. 202211078834.5 dated Mar. 23, 2024. 9 pages.

* cited by examiner

METHOD FOR PROCESSING COLOR DATA, LIGHT SOURCE SYSTEM, DEVICE, EQUIPMENT, AND STORAGE MEDIUM

CROSS-REFERENCE TO RELATED APPLICATIONS

This application is the national phase entry of International Application No. PCT/CN2023/078375, filed on Feb. 27, 2023, which is based upon and claims priority to the Chinese Patent Application No. 202211078834.5, filed on Sep. 5, 2022, the entire contents of which are incorporated herein by reference.

TECHNICAL FIELD

The present application relates to the field of data processing technologies, and in particular, to a method for processing color data, a light source system, a device, a piece of equipment and a storage medium.

BACKGROUND

Color information on a display screen of media playback equipment is a universal visual characteristic. Most light sources used with media playback equipment can collect a display image based on a camera, and control a lighting effect of the light source based on pixel values of all pixels in the display image, so that a color rendering of the light source is consistent with the color rendering of the display screen. In this way, due to the need for image processing, a data processing delay is between 200 and 300 milliseconds or even higher. To ensure timeliness, color sensors can be used to collect color data in some technologies. Due to the influence of an external light source, a screen distance, an angle between lens and screen and other factors, the color data collected by the color sensor is significantly different from the real color data, resulting in the lighting effect achieved by the color rendering of the light source is not realistic enough. In actual experiences, a user may feel that the display screen displays cyan while the light source displays green, the display screen displays pink while the light source displays purple or red, which results in an insufficient immersion.

SUMMARY

Embodiments of the present application provide a method for processing color data, a light source system, a device, a piece of equipment, and a storage medium, which can solve the problem of inconsistent color rendering between the light source and the display screen caused by a low color accuracy of current color sensors.

A first aspect of embodiments of the present application provides a method for processing color data, which includes steps of: obtaining initial color data of a target display area collected by a color sensor; converting the initial color data into color data to be processed in a target color space, where the target color space includes a saturation channel and a brightness channel; adjusting an initial saturation value of the color data to be processed in the saturation channel and/or an initial brightness value of the color data to be processed in the brightness channel to obtain first target color data, where the first target color data is applied to adjust a color rendering of the light source to enable a color rendering error between the color rendering of the light source and a color rendering of the target display area to be within an error margin.

A second aspect of the embodiments of the present application provides a light source system, which includes a light source, a color sensor, and process equipment. The color sensor is configured to collect initial color data of a target display area. The process equipment is configured to convert the initial color data into color data to be processed in a target color space, and the target color space includes a saturation channel and a brightness channel, and configured to adjust an initial saturation value of the color data to be processed in the saturation channel and/or an initial brightness value of the color data to be processed in the brightness channel to obtain first target color data. The light source is configured to perform a color rendering adjustment according to the first target color data, to enable a color rendering error between a color rendering of the light source and a color rendering of the target display area to be within an error margin.

A third aspect of the embodiment of the present application provides a device for processing color data, which includes: an acquisition unit, a conversion unit and an adjustment unit. The acquisition unit is configured to obtain initial color data of a target display area collected by a color sensor. The conversion unit is configured to convert the initial color data to be color data to be processed in a target color space, and the target color space includes a saturation channel and a brightness channel. The adjustment unit is configured to adjust an initial saturation value of the color data to be processed in the saturation channel and/or an initial brightness value of the color data to be processed in the brightness channel to obtain first target color data, and the first target color data is applied to adjust a color rendering of the light source, to enable a color rendering error between the color rendering of the light source and a color rendering of the target display area to be within an error margin.

A fourth aspect of the embodiments of the present application provides a piece of equipment, including a memory, a processor, and a computer program stored in the memory and executable by the processor. The processor when executing the computer program, is configured to implement steps of the above processing method.

A fifth aspect of the embodiments of the present application provides a computer-readable storage medium, in which a computer program is stored. The computer program, when executed by a processor, enables steps of the above processing method to be implemented.

A sixth aspect of the embodiments of the present application provides a computer program product. The computer program product, when executed by a device, causes the device to perform the processing method described in the first aspect.

In the embodiments of the present application, by means of obtaining the initial color data of the target display area collected by the color sensor, converting the initial color data into the color data to be processed in the target color space, and adjusting the initial saturation value of the color data to be processed in a saturation channel and/or an initial brightness value of the color data to be processed in a brightness channel, the first target color data is obtained, among them, the first target color data can be applied to adjust a color rendering of the light source to compensate for the ambient light's effect on the saturation and brightness of color when collected by the color sensor, so that a color rendering error between the color rendering of the light source and the color rendering of the target display area is enabled to be within an error margin.

BRIEF DESCRIPTION OF DRAWINGS

To more clearly illustrate the technical solutions in the embodiments of the present application, the drawings needed to be used in the description of the embodiments will be briefly introduced below. Obviously, the drawings in the following description are merely some embodiments of the present application. For those of ordinary skill in the art, other drawings may also be obtained based on these drawings without exerting creative efforts.

DETAILED DESCRIPTION OF EMBODIMENTS

In order to make the purpose, technical solutions and advantages of the present application more clearly, the present application will be further described in detail below with reference to the drawings and embodiments. It should be understood that specific embodiments described here are only intended to interpret the present application rather than being intended to limit the present application. All other embodiments obtained based on the embodiments of the present application by persons of ordinary skills in this field without exerting creative efforts shall be included within the protection of the present application.

In some technologies, color sensors can be configured to collect color data. Research has found that due to the influence of an external light source, a screen distance, an angle between lens and screen and other factors, the color data collected by the color sensor is significantly different from the real color data, the collected saturation and brightness of the color become lower when compared with the real color data, resulting in the lighting effect achieved by the color rendering of the light source is not realistic enough. In actual experiences, the user feels that the display screen displays cyan while the light source displays green, the display screen displays pink while the light source displays purple or red, thus the immersion is insufficient.

Therefore, the present application provides a method for processing color data, where a saturation and/or brightness of the color data collected by a color sensor is (are) adjusted when controlling the light source to perform a color rendering following the display screen, to enable a color rendering error between the color rendering of the light source and the color rendering of the target display area to be within an error margin.

Figure 1:
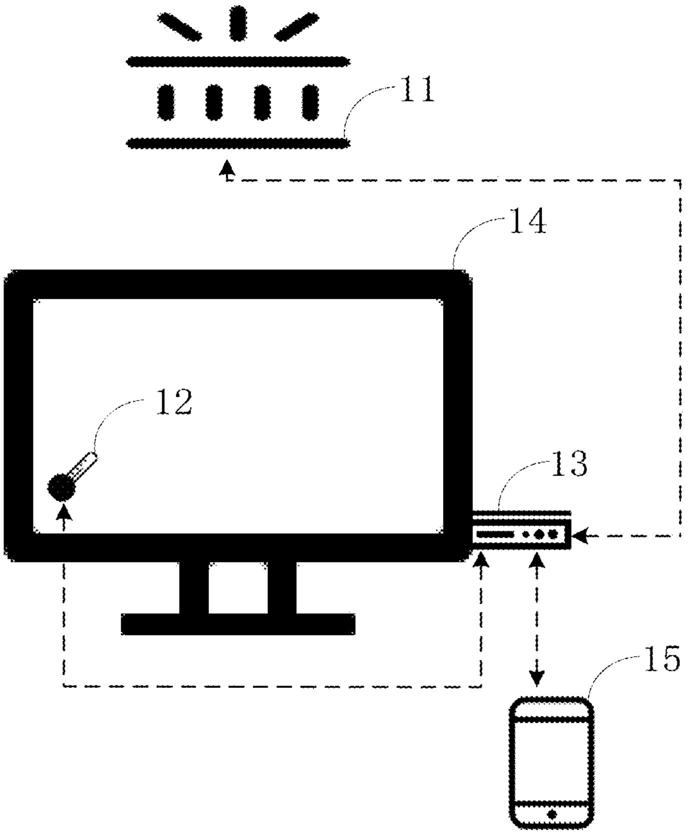
FIG. 1 is a schematic structural diagram of a light source system provided by an embodiment of the present application.

Referring to FIG. 1, the present application provides a light source system, which may include a light source 11, a color sensor 12, and process equipment 13. In this system, the light source 11, the color sensor 12, and the process equipment 13 may be connected to each other in a wired or wireless manner. The number of light sources 11 and color sensors 12 may be one or more. In other embodiments, the light source system may also include media playback equipment 14 and control equipment 15.

The color sensor 12 may be disposed within a certain distance from the display screen of the media playback equipment 14 to collect initial color data of a target display area. The target display area may refer to part or all of the display area of the display screen of the media playback equipment 14, and the media playback equipment 14 may refer to a television, a computer, or other devices having media playback functions. The process equipment 13 may be configured to obtain the initial color data collected by the color sensor 12 and convert the initial color data into color data to be processed in a target color space. The target color space includes a saturation channel and a brightness channel, whereby, the process equipment 13 can adjust an initial saturation value of the color data to be processed in the saturation channel and/or an initial brightness value of the color data to be processed in the brightness channel to obtain first target color data. Then, the first target color data may be sent by the process equipment 13 to the light source 11 by which a color rendering adjustment is performed according to the first target color data, to enable the color rendering error between the color rendering of the light source 11 and the color rendering of the target display area to be within the error margin.

Particularly, in some implementations, the user may control the light source system through the control equipment 15, and the control equipment 15 may refer to a smart device such as a mobile phone, a tablet computer, or a smart watch. Taking a mobile phone as an example, the user may send a control instruction to the process equipment 13 via an application program on the mobile phone, and the control instruction may carry a control mode that is selected by the user. When the control mode is that the light source 11 develops color in conjunction with the media playback equipment 14, the process equipment may obtain the initial color data collected by the color sensor 12, and send the first target color data obtained by processing to the light source 11, to enable the color rendering of the light source 11 to be consistent with the color rendering of the target display area in the media playback equipment 14.

A process for color data processing in the light source system will be described below through specific embodiments.

Figure 2:
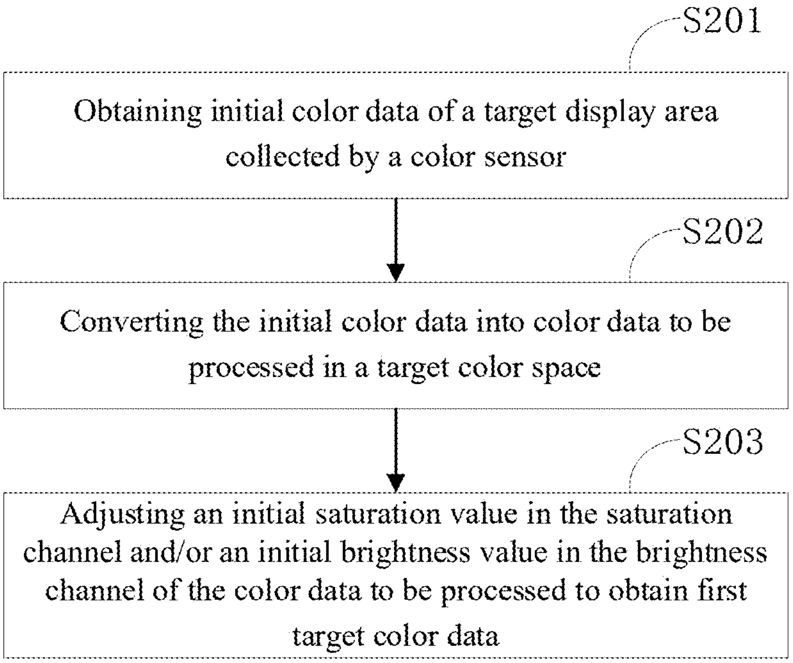
FIG. 2 is a schematic diagram of an implementation flow of a method for processing color data provided by an embodiment of the present application.

FIG. 2 shows a schematic diagram of an implementation flow of the method for processing color data provided by an embodiment of the present application. This method may be applied to a piece of equipment and is applicable to situations where the color of the light source and the display screen need to be consistent. Among them, the above-mentioned equipment may refer to the process equipment 13 in the light source system shown in FIG. 1.

Particularly, the above method for processing color data may include the following steps S201 to S203.

In step S201: initial color data of a target display area collected by a color sensor is obtained.

In an embodiment of the present application, the color sensor may include a color extraction structure, and the color extraction structure may collect color data of the target display area through a color extraction port. The color data collected by the color extraction structure is generally the color data of an initial color space, where the initial color space generally refers to a RGB space. In the initial color space, the color data includes color values of three color channels R, G, and B.

In step S202: the initial color data is converted into color data to be processed in a target color space.

In an embodiment of the present application, the target color space may include a saturation channel and a brightness channel. Particularly, the target color space may refer to a HSL color space, which is also called a HSB color space or a HSV color space. Color data in the HSL color space may be consisted of three channels, i.e., hue (Hue), saturation (Saturation), and brightness (Lightness/Brightness/Value). Among them, hue is the basic attribute of color, such as red, yellow, etc. Saturation refers to the purity of a color, the higher the saturation, the purer and brighter the color is; the lower the saturation, the darker the color. The saturation has a value range of 0 to 100%. The brightness (Lightness) has a value range of 0 to 100%, the greater the brightness, the more the color tends to be "white", otherwise, the color is more likely to be "black".

Compared with the RGB channel, a target color channel is more in line with human sensory experience. Meanwhile, it is noted that factors such as an external light source, a screen distance, and an angle between the lens and the screen will affect the saturation and brightness of the color collected by the color sensor. Therefore, the initial color data is converted into color data to be processed in the target color space, and then the saturation channel and brightness channel can be adjusted in the target color space to facilitate color processing.

In step S203: an initial saturation value of the color data to be processed in a saturation channel and/or an initial brightness value of the color data to be processed in the brightness channel is (are) adjusted to obtain first target color data.

The above adjustment may refer to an increase or a decrease. In specific embodiments of the present application, the initial saturation value of the color data to be processed in the saturation channel may be increased, and/or the initial brightness value of the color data to be processed in the brightness channel may be increased. The specific amount of adjustment may be set according to the actual situation, for example, it may be a preset adjustment amount.

In an embodiment of the present application, the first target color data may be applied to adjust a color rendering of the light source so that the color rendering error between the color rendering of the light source and the color rendering of the target display area is within the error margin. In this embodiment, the error margin may be adjusted according to the actual situation. That is, the saturation and brightness of the color collected by the color sensor may be adjusted in such a way that the color rendering of the light source and the color rendering of the target display area of the media playback equipment are tended to be consistent.

In the embodiment of the present application, the initial color data of the target display area collected by the color sensor is obtained, the initial color data is converted into the color data to be processed in the target color space, and then the initial saturation value of the color data to be processed in the saturation channel and/or the initial brightness value of the color data to be processed in the brightness channel is (are) adjusted to obtain the first target color data, where the first target color data can be applied to adjust the color rendering of the light source to compensate for the ambient light's effect on the saturation and brightness of color when collected by the color sensor, thereby the color rendering error between the color rendering of the light source and the color rendering of the target display area can be within the error margin.

Particularly, a specific adjustment process of color data is as follows.

First, the initial color data may include the color values of the three color channels of RGB, the color values of the three color channels are normalized respectively to between 0 and 1, and the maximum value $C_{MAX}$ and minimum value $C_{MIN}$ of the three color channels of R, G, and B are presented. At this time, the initial brightness value of the brightness channel is calculated based on a formula of $L=(C_{MAX}+C_{MIN})/2$. The initial saturation value S of the saturation channel and the initial hue value H of the hue channel may also be determined based on the maximum value $C_{MAX}$, the minimum value $C_{MIN}$, and the initial brightness value L. If the maximum value $C_{MAX}$ and the minimum value $C_{MIN}$ are the same, indicating that the color is gray, then the initial saturation value S is 0, and H may be set to a default value, such as 0. Otherwise, if the initial brightness value L is less than a brightness threshold, then the initial saturation value $S=(C_{MAX}-C_{MIN})/(C_{MAX}+C_{MIN})$. If the initial brightness value L is greater than or equal to the brightness threshold, then the initial saturation value $S=(C_{MAX}-C_{MIN})/(2.0-C_{MAX}-C_{MIN})$. Among them, the brightness threshold may be adjusted according to actual situations, for example, the brightness threshold may be 0.5 (50%). The initial hue value H is calculated as follows: If the color value R in the R channel is the maximum value $C_{MAX}$, then the initial hue value $H=(G-B)/(C_{MAX}-C_{MIN})\times 60$. If the color value G in the G channel is the maximum value $C_{MAX}$, then the initial hue value $H=2.0+(B-R)/(C_{MAX}-C_{MIN})\times 60$. If the color value B in the B channel is the maximum value $C_{MAX}$, then the initial hue value $H=4.0+(R-G)/(C_{MAX}-C_{MIN})\times 60$. If the calculated initial hue value H is negative, then the initial hue value H=H+360.

It can be seen from the above conversion process that the initial brightness value Lis related to a total amount of the maximum color component and the minimum color component of the target display area. Therefore, the smaller the brightness, the more the color rendering tends to be black, otherwise the color tends to be bright white. The initial saturation value S is related to a difference between the maximum color component and the minimum color component. Therefore, the smaller the saturation, the more the color rendering tends to be a grayscale image, otherwise the color rendering will be more vivid.

The initial brightness value L, initial saturation value S, and initial hue value H may form the color data to be processed in the HSL color space (target color space). Among them, the initial hue value H is expressed as an angle (0 to 360°), the initial saturation value S is expressed as a percentage (0 to 100%), and the initial brightness value L is expressed as a percentage (0 to 100%).

The color data to be processed is processed as follows:

If the initial saturation value is within a first adjustable range, then the initial saturation value is adjusted, according to a saturation segment in which the initial saturation value is included, to the maximum value corresponding to the corresponding saturation segment. And/or, if the initial brightness value is within a second adjustable range, then the initial brightness value is adjusted, according to a brightness segment in which the initial brightness value is included, to the maximum value corresponding to the corresponding brightness segment.

That is to say, if the saturation and brightness are within their corresponding adjustable range, then the saturation and brightness may be adjusted in segment within the adjustable range.

Particularly, the first adjustable range may be set according to the actual situations, for example, the first adjustable range may be set as [20%, 100%]. In the first adjustable range, every 20% may be divided into a saturation segment. If 20%≤S<40%, then the initial saturation value S is increased to 40%, if 40%≤S<60%, then the initial saturation value S is increased to 60%, if 60%≤S<80%, then the initial saturation value S is increased to 80%, and if 80%≤S<100%, then the S is increased to 100%.

Likewise, the second adjustable range may also be set according to the actual situations, for example, the second adjustable range may be set to [20%, 60%]. In the second adjustable range, every 10% may be divided into a brightness segment. If 20%≤L<30%, then the initial brightness value L is increased to 30%, if 30%≤L<40%, the initial brightness value L is increased to 40%, if 40%≤L<50%, the initial brightness value L is increased to 50% and if 50%≤L<60%, then the initial brightness value L is increased to 60%.

Correspondingly, if the initial saturation value is beyond the first adjustable range, and/or the initial brightness value is beyond the second adjustable range, then a preset target color may be obtained, and the color data corresponding to the target color may be obtained as second target color data. The second target color data is applied to adjust the color rendering of the light source to enable the color rendered by the light source to be the target color.

Particularly, in some embodiments of the present application, if S<20%, the color rendering of the target display area is gray biased, and if L<20%, the color rendering of the target display area is black biased, in these two cases, the color data corresponding to the target color may be used as the second target color data. Among them, the target color may be any color set by the user. For example, when the color set by the user is white, the color data corresponding to white may be used as the second target color data, and then the light source is adjusted to display white. At this time, although the color rendering of the light source is different from the color rendering of the target display area, the color rendering can be adapted to user habits.

In other embodiments of the present application, if L>60%, the color rendering will be white biased. To ensure consistency between the color rendering of the light source and the color rendering of the target display area, the color data corresponding to white may be used as the second target color data.

Considering that the light source usually uses color data of the RGB color channels, the first target color data may also be converted into third target color data of an available color space, and the color rendering of the light source is controlled according to the third target color data.

In the embodiments, the available color space is a color space used by the light source, for example, the RGB color space.

Particularly, the equipment may convert the first target color data in the HSL color space into the third target color data in the RGB color space in the following manner.

It is assumed that the target saturation value of the first target color data in the saturation channel is S', the target brightness value of the first target color data in the brightness channel is L', and the target hue value of the first target color data in the hue channel is H'. First, if the target saturation value S'=0, indicating that the color finally displayed by the light source is gray, then the target color value in the three channels of R, G and B may all be defined as the target brightness value L'. Otherwise, if the target brightness value L' is less than 0.5, then temp2=L'×(1.0+S'), if the target brightness value is greater than or equal to 0.5, then temp2=L'+S'−L'×S', and correspondingly, temp1=2.0×L−temp2. The target hue value H' is then normalized to 0 to 1, to obtain the normalized hue value H". At this time, for the R channel, temp3=H"+1.0/3.0. For G channel, temp3=H". For B channel, temp3=H"−1.0/3.0. It should be noted that if temp3 is less than 0, then temp3=temp3+1.0, and if temp3 is greater than 1, then temp3=temp3-1.0, otherwise no processing will be performed. The final channel value color of the corresponding channel is as follows: if 6.0×temp3 less than 1, then color=temp1+ (temp2-temp1)×6.0×temp3, if 2.0×temp3 less than 1, then color=temp2, if 3.0×temp3 less than 2, then color=temp1+ (temp2−temp1)×((2.0/3.0)−temp3)×6.0, otherwise color=temp1. Among them, temp1, temp2 and temp3 are three intermediate parameters generated during the calculation process.

After conversion, the color values of the three color channels R, G, and B may be obtained to form the third target color data. The third target color data may be directly applied to the light source, to enable the light source to perform the color rendering adjustment according to the third target color data, in this case, the color rendering error between the color rendering of the light source and the color rendering of the target display area is within the error margin.

Considering that, the user may have a sense of visual impact in case that the color of the light source changes suddenly, which will reduce the user's immersion. Thus, when controlling the color rendering of the light source according to the third target color data, the current color data of the current color rendering of the light source may be obtained, where the current color data may refer to the default configuration color data or the data from the previous color adjustment. According to the current color data and the third target color data, fourth target color data at each adjustment moment within an adjustment period may be determined. The adjustment period may be set according to the actual situations, and at least two adjustment moments may be included within the adjustment period. The color rendering corresponding to the fourth target color data at each adjustment moment, compared with the color rendering corresponding to the fourth target color data at the previous adjustment moment, is closer to the color rendering corresponding to the third target color data. In this way, the light source is controlled for color rendering according to the corresponding fourth target color data at each adjustment moment, so that the current color rendering of the light source is gradually changed to the color rendering corresponding to the third target color data during the color rendering process, thereby the visual impact problem caused by color mutations can be avoided.

Figure 3:
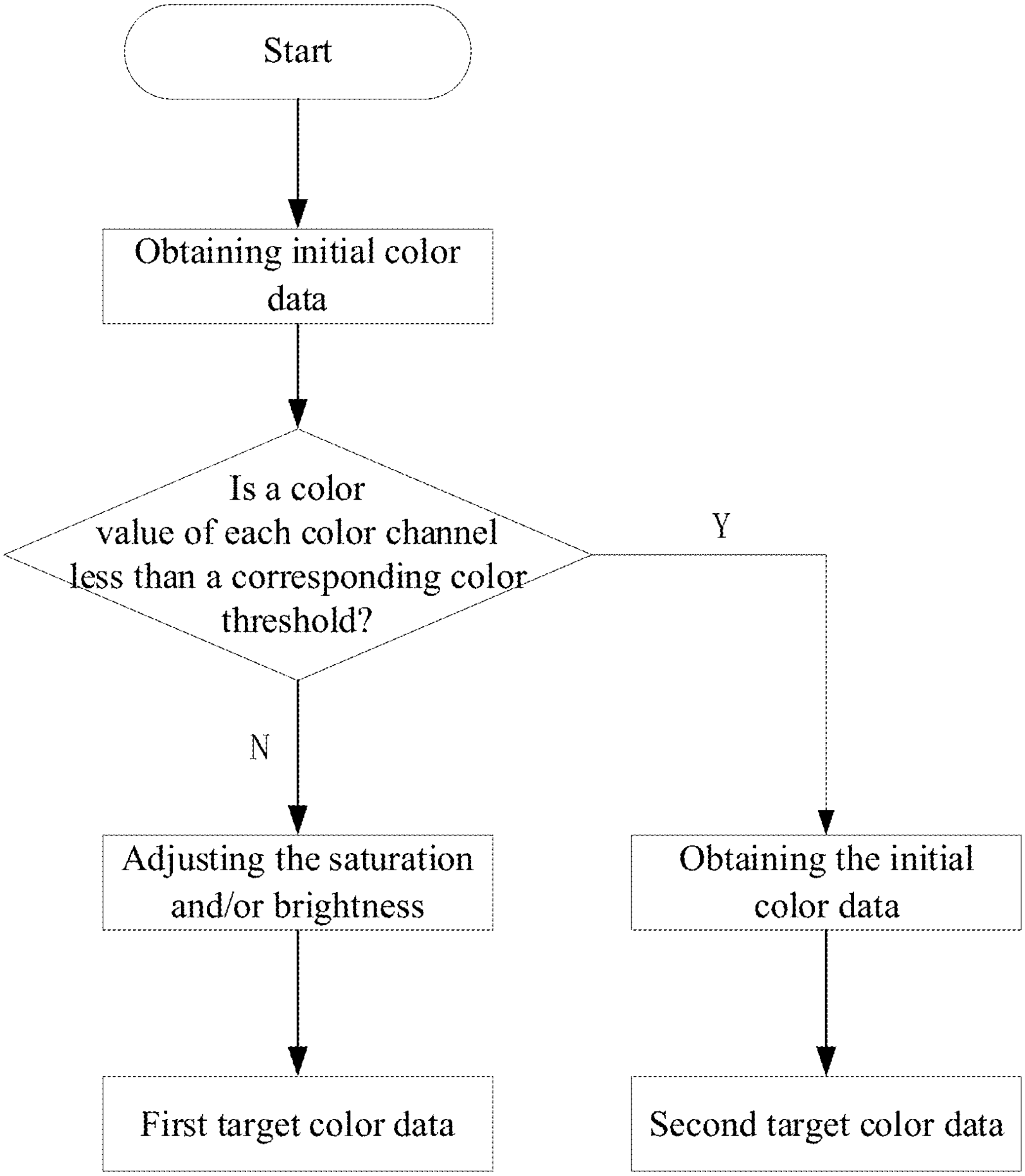
FIG. 3 is a schematic diagram of a specific flow of the method for processing color data provided by an embodiment of the present application.

In other embodiments of the present application, since the color displayed at the target display area is gray-black, the lighting effect experienced by the user is still poor even if the saturation and brightness are adjusted. Thus, as shown in FIG. 3, it may be detected whether the initial color data meets the processing conditions before processing the color data. If the color value of each color channel of at least one color channel included in the initial color data is less than the corresponding color threshold, then the preset target color is obtained, and the color data corresponding to the target color is used as the second target color data. Otherwise, the first target color data is obtained by processing according to step S102 and step S103. The second target color data is applied to adjust the color rendering of the light source so that the color rendered by the light source is the target color. Among them, the color threshold of each color channel may be the same or different, and is adjustable according to the actual situations. The target color may be a pre-configured default color, a user-set color, or other colors.

For example, in case that the red value in the R channel, the green value in the G channel and the blue value in the B channel of the initial color data are less than the corresponding color thresholds, then the color data corresponding to the target color may be used as the second target color data, and the color rendering of the light source is controlled according to the second target color data.

In some embodiments, considering that the light source is adjusted based on the color of the target display area of the media playback equipment, a media image of a media file played in the target display area may be obtained, and the media image includes one or multiple frames of images, preferably, the first N frames of images at the current moment, and N is greater than or equal to 1. Based on the one or multiple frames of images, a dominant color of the media file may be determined and used as the target color. The dominant color is also the main color. The color corresponding to the pixel average of all pixels in the above-mentioned one or multiple frames of images may be used as the dominant color. Alternatively, the corresponding target color may also be determined based on the type of media file. Taking movies as an example, the target color corresponding to suspense movies may be gray and off-white, and the target color corresponding to comedy movies may be yellow, green, etc.

In addition, to ensure that the color rendering of the light source is consistent with the first target color data, a white balance adjustment may be performed on the light source before controlling the color rendering of the light source according to the first target color data. Particularly, the light source may be composed of light points in three channels: red, blue, and green. The user is enabled to adjust the brightness and saturation of one or more light points on the application according to the visual experience, and then the process equipment can control the corresponding light points to display according to the brightness and saturation adjusted by the user, and then the light points of the red, blue and green channels display white together.

To determine whether factors such as an ambient light, a screen distance, an angle between the lens and the screen have an impact on the color sensor, the target display area may also be controlled to display multiple calibration patterns in sequence before the initial color data is obtained, where each calibration pattern corresponds to a color. Then, the calibration color data corresponding to each calibration pattern collected by the color sensor in sequence is obtained, whereby the color rendering error between the calibration color data corresponding to each calibration pattern and the real color data can be calculated. If the color rendering error is beyond the error margin, the color data is processed according to steps S201 to S203 when processing the initial color data, otherwise, the initial color data may be directly applied to the light source.

Particularly, the process equipment may calculate a difference between the calibration color data corresponding to each calibration pattern and the real color data as the color rendering error corresponding to each calibration pattern, then a final color rendering error is determined according to the corresponding color rendering error corresponding to each calibration pattern by means of weighted addition, averaging, etc. If the final color rendering error is beyond the error margin, indicating that the color sensor have been affected by the current ambient light, screen distance, angle between the lens and the screen or other factors, then the color data may be processed according to steps S201 to S203 when processing the initial color data, otherwise, it is indicated that the current ambient light, screen distance, angle between the lens and the screen and other factors have no impact on the color sensor, and the initial color data may be directly applied to the light source.

Likewise, the method of displaying the calibration pattern may also be applied to test the color rendering of the light source. Upon testing, the accuracy of the color rendering of the light source (that is, the degree of consistency between the color rendering of the light source and the color rendering of the target display area) can be improved to more than 95% by means of the processing method provided by the present application. The background of the target display screen is provided with the light source, which enables the background of the target display screen to be brighter and a stronger diffuse reflection effect can be realized, giving people an immersive viewing experience and bringing them spiritual pleasure.

It should be noted that for the sake of simple description, the foregoing method embodiments are expressed as a series of action combinations. However, it should be noted for persons skilled in the art that the present application is not limited by the described action sequence, as certain steps according to the present application may be performed in other orders.

Figure 4:
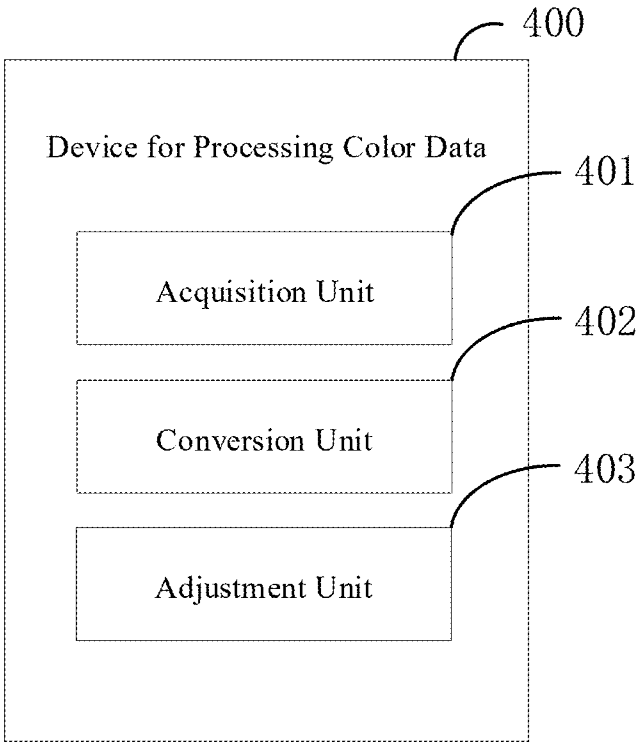
FIG. 4 is a schematic structural diagram of a device for processing color data provided by an embodiment of the present application.

FIG. 4 shows a schematic structural diagram of a device 400 for processing color data provided by an embodiment of the present application. The device 400 for processing color data is configured on equipment. For example, the device 400 for processing color data is configured on the process equipment 13 of the light source system shown in FIG. 1.

Particularly, the device 400 for processing color data may include an acquisition unit 401, a conversion unit 402, and an adjustment unit 403.

The acquisition unit 401 is configured to obtain initial color data of a target display area collected by a color sensor.

The conversion unit 402 is configured to convert the initial color data into color data to be processed in a target color space, where the target color space includes a saturation channel and a brightness channel.

The adjustment unit 403 is configured to adjust an initial saturation value of the color data to be processed in the saturation channel and/or an initial brightness value of the color data to be processed in the brightness channel to obtain first target color data, the first target color data is applied to adjust the color rendering of the light source to enable a color rendering error between a color rendering of a light source and a color rendering of the target display area to be within an error margin.

In some embodiments of the present application, the above-mentioned initial color data includes a color value of at least one color channel. The above-mentioned device 400 for processing color data may also include a dark color processing unit, which is configured to: obtain the preset target color if the color value of each color channel in the at least one color channel is less than the corresponding color threshold. The color data corresponding to the target color is used as the second target color data, and the second target color data is applied to adjust the color rendering of the light source so that the color rendered by the light source is the target color.

In some embodiments of the present application, the above-mentioned adjustment unit 403 may be particularly configured to: adjust the initial saturation value according to a saturation segment in which the initial saturation value is included, to the maximum value corresponding to the corresponding saturation segment if the initial saturation value is within the first adjustable range; and/or, adjust the initial brightness value, according to a brightness segment in which the initial brightness value is included, to the maximum value corresponding to the corresponding brightness segment if the initial brightness value is within the second adjustable range.

In some embodiments of the present application, the above-mentioned dark processing unit may also be particularly configured to: obtain the preset target color if the initial saturation value is beyond the first adjustable range and/or the initial brightness value is beyond the second adjustable range; and use the color data corresponding to the target color as the second target color data, and the second target color data is applied to adjust the color rendering of the light source so that the color rendered by the light source is the target color.

In some embodiments of the present application, the above-mentioned device 400 for processing color data may also include a control unit, which is configured to: convert the first target color data into third target color data in an available color space, the available color space is the color space used by the light source; and control the color rendering of the light source according to the third target color data.

In some embodiments of the present application, the above-mentioned control unit may be particularly configured to: obtain current color data of the current color rendering of the light source; determine, according to the current color data and the third target color data, fourth target color data at each adjustment moment within an adjustment period, where the color rendering corresponding to the fourth target color data at each adjustment moment, compared with the color rendering corresponding to the fourth target color data at the previous adjustment moment, is closer to the color rendering corresponding to the third target color data; and control the color rendering of the light source according to the corresponded fourth target color data at each adjustment moment.

It should be noted that, for the convenience and simplicity of description, the specific working process of the above-mentioned device 400 for processing color data may refer to the corresponding processes of the methods described in FIGS. 1 to 3, and will not be repeated here.

Figure 5:
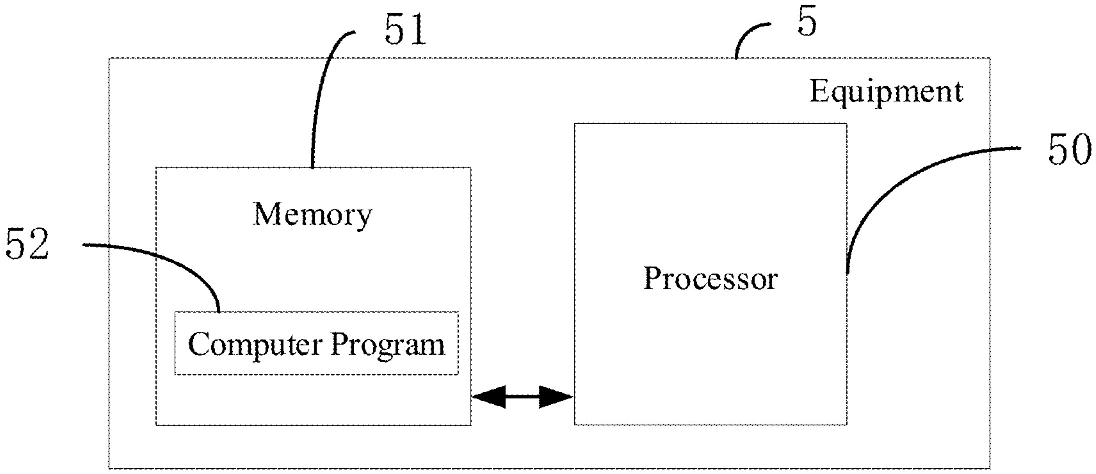
FIG. 5 is a schematic structural diagram of a piece of equipment provided by an embodiment of the present application.

As shown in FIG. 5, which is a schematic diagram of a piece of equipment provided by an embodiment of the present application. The equipment 5 may be the process equipment 13 of the light source system shown in FIG. 1 and may include: a processor 50, a memory 51 and a computer program 52 (for example, color data processing program) stored in the memory 51 and executable by the processor 50. When the computer program 52 is executed by the processor 50, the steps of the method for processing color data in the above embodiments such as steps S201 to S203 shown in FIG. 2, are implemented. Alternatively, when the computer program 52 is executed by the processor 50, the functions of each module/unit in each of the above device embodiments, such as the acquisition unit 401, the conversion unit 402 and the adjustment unit 403 shown in FIG. 4, are implemented.

The computer program may be divided into one or more modules/units, and the one or more modules/units are stored in the memory 51 and executed by the processor 50 to complete this application. The one or more modules/units may be a series of computer program instruction segments capable of completing specific functions, and the instruction segments are used to describe the execution process of the computer program in the equipment.

For example, the computer program may be divided into: an acquisition unit, a conversion unit and an adjustment unit. The specific functions of each unit are as follows: the acquisition unit is configured to obtain initial color data of a target display area collected by a color sensor; the conversion unit is configured to convert the initial color data into color data to be processed in a target color space, and the target color space includes a saturation channel and a brightness channel; and the adjustment unit is configured to adjust an initial saturation value of the color data to be processed in the saturation channel and/or an initial brightness value of the color data to be processed in the brightness channel to obtain first target color data, and the first target color data is applied to adjust a color rendering of a light source so that a color rendering error between the color rendering of the light source and the color rendering of the target display area is within an error margin.

The equipment may include, but is not limited to, a processor 50 and a memory 51. Persons skilled in the art can understand that FIG. 5 is only an example of the equipment and does not constitute a limitation for the equipment. More or fewer components may be included than shown in this figure, or certain components, or different components may be combined, for example, the above-mentioned equipment may also include input and output devices, network access devices, buses, etc.

The processor 50 may be a central processing unit (CPU), or other general-purpose processor, a digital signal processor (Digital Signal Processor, DSP), an application specific integrated circuit (Application Specific Integrated Circuit, ASIC), a field-programmable gate array (FPGA) or other programmable logic devices, discrete gate or transistor logic devices, discrete hardware components, etc. The general-purpose processor may be a microprocessor or the processor may also be any conventional processor, etc.

The memory 51 may be an internal storage unit of the equipment, such as a hard disk or memory of the equipment. The memory 51 may also be an external storage device of the equipment, such as a plug-in hard disk, a smart memory card (Smart Media Card, SMC), a secure digital (SD) card, or a flash card (Flash Card) etc., equipped on the equipment. Further, the memory 51 may also include both an internal storage unit of the equipment and an external storage equipment. The memory 51 is used to store the computer program and other programs and data required by the equipment. The memory 51 may also be used to temporarily store data that has been output or is to be output.

It should be noted that, for the convenience and simplicity of description, the structure of the above equipment may also refer to the specific description of the structure in the method embodiment, and will not be described again here.

It should be clearly understood by persons skilled in the art that for the convenience and simplicity of description, the division of the above functional units and modules is merely used as an example. In actual applications, the above functions may be allocated to different functional units and modules based on needs for implementation, that is, the internal structure of the equipment is divided into different functional units or modules to complete all or part of the functions described above. Each functional unit and module in the embodiment may be integrated into one processing unit, or each unit may exist physically alone, or two or more units may be integrated into one unit. The above-mentioned integrated unit may be implemented either in the form of hardware or in the form of software functional units. In addition, the specific names of each functional unit and module are only for the convenience of distinguishing each other and are not intended to limit the protection scope of the present application. For the specific working processes of the units and modules in the above system, reference may be made to the corresponding processes in the foregoing method embodiments, which will not be described again here.

In the above embodiments, the description of each embodiment has its own emphasis. For parts that are not detailed or documented in a certain embodiment, reference may be made to the relevant descriptions of other embodiments.

It will be appreciated by persons of ordinary skills in the art that the units and algorithm steps of each example described in conjunction with the embodiments disclosed herein may be implemented through electronic hardware, or through a combination of computer software and electronic hardware. Whether these functions are performed in hardware or software depends on the specific application and design constraints of the technical solution. Experts and technicians may use different methods to implement the described functions for each specific application, but such implementations should not be considered to be beyond the scope of the present application.

In the embodiments provided in the present application, it should be understood that the disclosed device/equipment and method may be implemented in other ways. For example, the device/equipment embodiment described above are only illustrative, for example, the division of modules or units is only a logical function division, while in actual implementations, other division manner may be presented, such as multiple units or components may be combined or may be integrated into another system, or some features may be ignored, or not implemented. On the other hand, the coupling or direct coupling or communication connection between each other shown or discussed may be indirect coupling or communication connection via some interfaces, devices or units, and may be in electrical, mechanical or other forms.

The units described as separate components may or may not be physically separated, and the components shown as units may or may not be physical units, that is, those units or components may be located in one place, or may be distributed to multiple network units. Some or all of the units may be selected according to actual needs to achieve the objective of the solution of the embodiment.

In addition, various functional unit in each embodiment of the present application may be integrated into one processing unit, each unit may exist physically alone, or two or more units nay be integrated into one unit. The above integrated unit may be implemented in the form of hardware or software functional units.

If the integrated module/unit is implemented in the form of a software functional unit and sold or used as an independent product, then the integrated module/unit may be stored in a computer-readable storage medium. Based on this understanding, all or part of the processes in the methods of the above embodiments of the present application may implemented or may be completed by instructing relevant hardware through a computer program. The computer program may be stored in a computer-readable storage medium, and the computer program when being executed by the processor, may cause the steps of each of the above method embodiments to be implemented. Among them, the computer program includes a computer program code, which may be in the form of source code, object code, executable file or may be in some intermediate form. The computer-readable medium may include: any entity or device capable of carrying the computer program code, a recording media, a U disk, a mobile hard disk, a magnetic disk, an optical disk, a computer memory, a read-only memory (Read-Only Memory, ROM), a random-access memory (Random Access Memory, RAM), an electrical carrier signal, a telecommunications signal, and a software distribution medium, etc. It should be noted that the content contained in the computer-readable medium may be appropriately added or deleted according to the requirements of legislation and patent practice in the jurisdiction. For example, in some jurisdictions, according to legislation and patent practice, the computer-readable medium excludes electrical carrier signals and telecommunications signals.

The foregoing embodiments are merely intended to illustrate the solutions of the present application rather than being intended to limit the present application. Although the present application has been described in detail with reference to the foregoing embodiments, persons of ordinary skills in the art should understand that it is still possible to modify the solutions described in the foregoing embodiments or to make equivalent substitutions of some of the features in the embodiments; and that these modifications or substitutions do not cause the essence of the corresponding solutions to deviate from the spirit and scope of the solutions in the embodiments of the present application, and shall all be included within the protection scope of the present application.

The invention claimed is:

1. A method for processing color data, comprising:

obtaining initial color data of a target display area collected by a color sensor;

before obtaining the initial color data, sequentially displaying multiple calibration patterns in the target display area and obtaining calibration color data corresponding to each of the multiple calibration patterns collected by the color sensor in sequence, to calculate a color rendering error between the calibration color data and real color data of each of the multiple calibration patterns, wherein each of the multiple calibration patterns corresponds to a color;

adjusting, if the color rendering error between the calibration color data and the real color data of each of the multiple calibration patterns falls within an error margin, a color rendering of a light source according to the initial color data; and converting, if the color rendering error between the calibration color data and the real color data of any of the multiple calibration patterns does not fall within the error margin, the initial color data into color data to be processed in a target color space, the target color space comprising a saturation channel and a brightness channel; adjusting an initial saturation value of the color data to be processed in the saturation channel and/or an initial brightness value of the color data to be processed in the brightness channel to obtain first target color data; and adjusting the color rendering of the light source according to the first target color data being applied, to enable the color rendering error between the color rendering of the light source and a color rendering of the target display area to be within the error margin.

2. The method for processing color data according to claim 1, wherein the initial color data comprises a color value of at least one color channel;

before said converting the initial color data into the color data to be processed in the target color space, the method for processing color data further comprises:

obtaining a preset target color if the color value of each color channel in the at least one color channel is less than a corresponding color threshold; and using color data corresponding to the preset target color as second target color data, wherein the second target color data is applied to adjust the color rendering of the light source, to enable a color rendered by the light source to be the preset target color.

3. The method for processing color data according to claim 1, wherein said adjusting the initial saturation value of the color data to be processed in the saturation channel and/or the initial brightness value of the color data to be processed in the brightness channel comprises:

adjusting the initial saturation value, according to a saturation segment in which the initial saturation value is included, to a maximum value corresponding to the corresponded saturation segment if the initial saturation value is within a first adjustable range; and/or adjusting the initial brightness value, according to a brightness segment in which the initial brightness value is included, to a maximum value corresponding to the corresponded brightness segment if the initial brightness value is within a second adjustable range.

4. The method for processing color data according to claim 3, wherein said adjusting the initial saturation value of the color data to be processed in the saturation channel and/or the initial brightness value of the color data to be processed in the brightness channel further comprises:

obtaining a preset target color if the initial saturation value is beyond the first adjustable range, and/or the initial brightness value is beyond the second adjustable range;

using color data corresponding to the preset target color as second target color data, the second target color data is applied to adjust the color rendering of the light source to enable a color rendered by the light source to be the preset target color.

5. The method for processing color data according to claim 1, wherein after the first target color data is obtained, the method for processing color data further comprises:

converting the first target color data into third target color data in an available color space, wherein the available color space is a color space used by the light source; and controlling the color rendering of the light source according to the third target color data.

6. The method for processing color data according to claim 5, wherein said controlling the color rendering of the light source according to the third target color data comprises:

obtaining current color data of a current color rendering of the light source; and determining, according to the current color data and the third target color data, fourth target color data at each adjustment moment within an adjustment period, wherein the color rendering corresponding to the fourth target color data at each adjustment moment is closer to the color rendering corresponding to the third target color data, with respect to the color rendering corresponding to the fourth target color data at a previous adjustment moment; and controlling the color rendering of the light source according to the corresponded fourth target color data at each adjustment moment.

7. A non-transitory computer-readable storage medium in which a computer program is stored, wherein the computer program, when executed by a processor, enables steps of the method for processing color data according to claim 1 to be implemented.

8. A light source system, comprising a light source, a color sensor, and process equipment;

the color sensor being configured to collect initial color data of a target display area;

the color sensor further configured to obtain, when the target display area displays multiple calibration patterns in sequence, calibration color data corresponding to each of the multiple calibration patterns, to calculate a color rendering error between the calibration color data and real color data of each of the multiple calibration patterns, wherein each of the multiple calibration patterns corresponds to a color;

the light source configured to adjust, when the color rendering error between the calibration color data and the real color data of each of the multiple calibration patterns falls within an error margin, a color rendering of a light source according to the initial color data;

the process equipment being configured to convert, when the color rendering error between the calibration color data and the real color data of any of the multiple calibration patterns does not fall within the error margin, the initial color data into color data to be processed in a target color space that comprises a saturation channel and a brightness channel, and adjust an initial saturation value of the color data to be processed in the saturation channel and/or an initial brightness value of the color data to be processed in the brightness channel, to obtain first target color data; and the light source being configured to adjust the color rendering of the light source according to the first target color data, to enable a color rendering error between a color rendering of the light source and a color rendering of the target display area to be within an error margin.

9. A piece of equipment, comprising a memory, a processor and a computer program stored in the memory and executable by the processor, wherein the processor, when executing the computer program, is configured to perform operations that comprise:

obtaining initial color data of a target display area collected by a color sensor;

before obtaining the initial color data, sequentially displaying multiple calibration patterns in the target display area and obtaining calibration color data corresponding to each of the multiple calibration patterns collected by the color sensor in sequence, to calculate a color rendering error between the calibration color data and real color data of each of the multiple calibration patterns, wherein each of the multiple calibration patterns corresponds to a color;

adjusting, if the color rendering error between the calibration color data and the real color data of each of the multiple calibration patterns falls within an error margin, a color rendering of a light source according to the initial color data; and converting, if the color rendering error between the calibration color data and the real color data of any of the multiple calibration patterns does not fall within the error margin, the initial color data into color data to be processed in a target color space, the target color space comprising a saturation channel and a brightness channel; adjusting an initial saturation value of the color data to be processed in the saturation channel and/or an initial brightness value of the color data to be processed in the brightness channel to obtain first target color data; and adjusting the color rendering of the light source according to the first target color data, to enable the color rendering error between the color rendering of the light source and a color rendering of the target display area to be within the error margin.

10. The equipment according to claim 9, wherein the initial color data comprises a color value of at least one color channel;

before said converting the initial color data into the color data to be processed in the target color space, the operations perform by the processor further comprise:

obtaining a preset target color if the color value of each color channel in the at least one color channel is less than a corresponding color threshold; and using color data corresponding to the preset target color as second target color data, wherein the second target color data is applied to adjust the color rendering of the light source to enable a color rendered by the light source to be the preset target color.

11. The equipment according to claim 9, wherein the operation of adjusting the initial saturation value of the color data to be processed in the saturation channel and/or the initial brightness value of the color data to be processed in the brightness channel comprises:

adjusting the initial saturation value, according to a saturation segment in which the initial saturation value is included, to a maximum value corresponding to the corresponded saturation segment if the initial saturation value is within a first adjustable range; and/or adjusting the initial brightness value, according to a brightness segment in which the initial brightness value is included, to a maximum value corresponding to the corresponded brightness segment if the initial brightness value is within a second adjustable range.

12. The equipment according to claim 11, wherein the operation of adjusting the initial saturation value of the color data to be processed in the saturation channel and/or the initial brightness value of the color data to be processed in the brightness channel further comprises:

obtaining a preset target color if the initial saturation value is beyond the first adjustable range, and/or the initial brightness value is beyond the second adjustable range;

using color data corresponding to the preset target color as second target color data, and the second target color data is applied to adjust the color rendering of the light source to enable a color rendered by the light source to be the preset target color.

13. The equipment according to claim 9, wherein after the first target color data is obtained, the operations perform by the processor further comprise:

converting the first target color data into third target color data in an available color space, wherein the available color space is a color space used by the light source; and controlling the color rendering of the light source according to the third target color data.

14. The equipment according to claim 13, wherein the operation of controlling the color rendering of the light source according to the third target color data comprises:

obtaining current color data of a current color rendering of the light source; and determining, according to the current color data and the third target color data, fourth target color data at each adjustment moment within an adjustment period, wherein the color rendering corresponding to the fourth target color data at each adjustment moment is closer to the color rendering corresponding to the third target color data, with respect to the color rendering corresponding to the fourth target color data at a previous adjustment moment; and controlling the color rendering of the light source according to the corresponded fourth target color data at each adjustment moment.

* * * * *